US012625007B2

(12) United States Patent
Barker et al.

(10) Patent No.: US 12,625,007 B2
(45) Date of Patent: May 12, 2026

(54) OPTOMECHANICALLY CALIBRATED PHOTONIC THERMOMETER AND CALIBRATING A PHOTONIC THERMOMETER

(71) Applicant: Government of the United States of America, as represented by the Secretary of Commerce, Gaithersburg, MD (US)

(72) Inventors: Daniel Schaeder Barker, Olney, MD (US); Nikolai Nikolaevich Klimov, Gaithersburg, MD (US); Thomas Patrick Purdy, Gaithersburg, MD (US)

(73) Assignee: GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 232 days.

(21) Appl. No.: 18/625,879

(22) Filed: Apr. 3, 2024

(65) Prior Publication Data
US 2024/0328863 A1    Oct. 3, 2024

Related U.S. Application Data

(60) Provisional application No. 63/456,604, filed on Apr. 3, 2023.

(51) Int. Cl.
*G01J 5/08* (2022.01)
*G01J 5/02* (2022.01)
*G01J 5/0818* (2022.01)
*G01J 5/80* (2022.01)
*G01K 15/00* (2006.01)

(52) U.S. Cl.
CPC ............ *G01J 5/0884* (2013.01); *G01J 5/023* (2013.01); *G01J 5/0818* (2013.01); *G01J 5/80* (2022.01); *G01K 15/005* (2013.01)

(58) Field of Classification Search
CPC ........ G01J 5/023; G01J 5/0818; G01J 5/0884; G01J 5/80; G01K 15/005
See application file for complete search history.

(56) References Cited

U.S. PATENT DOCUMENTS

| | | | | | |
|---|---|---|---|---|---|
| 3,611,805 | A | * | 10/1971 | Hishikari | G01J 5/60 |
| | | | | | 374/127 |
| 6,065,866 | A | * | 5/2000 | Kraus | G01J 5/53 |
| | | | | | 374/2 |
| 9,726,553 | B2 | | 8/2017 | Ahmed et al. | |
| 10,955,617 | B2 | | 3/2021 | Klimov et al. | |

(Continued)

OTHER PUBLICATIONS

Purdy, T.P., et al., "Quantum correlations from a room-temperature optomechanical cavity", Science, 2017, p. 1265-1268, vol. 356.

(Continued)

*Primary Examiner* — Blake C Riddick
(74) *Attorney, Agent, or Firm* — Office of Chief Counsel for National Institute of Standards and Technology

(57) ABSTRACT

A thermometer system includes a photonic thermometer; and an optomechanical thermometer configured to calibrate the photonic thermometer, thereby making the thermometer system an optomechanically calibrated photonic thermometer.

15 Claims, 6 Drawing Sheets

(56)　　　　　　References Cited

U.S. PATENT DOCUMENTS

| | | | | |
|---|---|---|---|---|
| 2004/0004989 A1* | 1/2004 | Shigeoka | .................. | G01J 5/08 |
| | | | | 374/121 |
| 2004/0240516 A1* | 12/2004 | Harr | ........................ | G01J 5/021 |
| | | | | 374/165 |
| 2009/0154519 A1* | 6/2009 | Price | ...................... | G01K 15/00 |
| | | | | 374/1 |
| 2014/0321502 A1* | 10/2014 | Ahmed | .................. | G01K 11/00 |
| | | | | 374/130 |
| 2019/0293809 A1* | 9/2019 | Tosh | ........................ | G01T 1/026 |
| 2020/0041431 A1* | 2/2020 | Herman | .................. | G01N 25/68 |
| 2020/0103594 A1* | 4/2020 | Klimov | ............. | G01K 11/3206 |
| 2022/0179285 A1* | 6/2022 | Klimov | ..................... | G02F 7/00 |
| 2023/0032022 A1* | 2/2023 | Klimov | ..................... | G01J 5/20 |

OTHER PUBLICATIONS

Purdy, T.P., et al., "Optomechanical Raman-ratio thermometry", Physical Review A, 2015, p. 031802, vol. 92.
Sarabalis, C.J., et al., "Release-free silicon-on-insulator cavity optomechanics", Optica, 2017, p. 1147-1150, vol. 4 No.9.

* cited by examiner

OPTOMECHANICALLY CALIBRATED PHOTONIC THERMOMETER AND CALIBRATING A PHOTONIC THERMOMETER

RELATED APPLICATIONS

This application claims the benefit of U.S. Provisional Patent Application Ser. No. 63/456,604 (filed Apr. 3, 2023), which is herein incorporated by reference in its entirety.

FEDERALLY-SPONSORED RESEARCH AND DEVELOPMENT

This invention was made with United States Government support from the National Institute of Standards and Technology (NIST), an agency of the United States Department of Commerce. The Government has certain rights in this invention.

COPYRIGHT NOTICE

FIELD OF INVENTION

The present invention relates generally to miniaturized thermometers, and more particularly to combining the benefits of a photonic thermometer and a optomechanical thermometer.

BACKGROUND

Thermometry is the science of measuring temperature. Temperature is a measure of the average kinetic energy of the particles in a system. The higher the temperature, the faster the particles are moving. There are many different methods for measuring temperature. Some common methods include:

Resistance thermometers: These thermometers measure the change in resistance of a material as a function of temperature.

Thermocouples: These thermometers measure the voltage generated by the junction of two different materials as a function of temperature.

Liquid-in-glass thermometers: These thermometers measure the expansion of a liquid as a function of temperature.

Infrared thermometers: These thermometers measure the intensity of infrared radiation emitted by an object as a function of temperature.

SUMMARY OF INVENTION

Each of these methods has its own advantages and disadvantages. Resistance thermometers are accurate and stable, but they can be slow to respond to changes in temperature. Thermocouples are fast and have a wide temperature range, but they can be inaccurate. Liquid-in-glass thermometers are inexpensive and easy to use, but they are not very accurate or stable. Infrared thermometers are fast and accurate, but they can be affected by the emissivity of the object being measured. Furthermore, resistance thermometers, liquid-in-glass, and infrared thermometers drift over time and all require frequent recalibrations.

According to one aspect of the invention, a nanophotonic thermometer system includes a photonic thermometer; and an optomechanical thermometer configured to calibrate the photonic thermometer, thereby making the thermometer system an optomechanically calibrated photonic thermometer. Such thermometer calibrates itself without taking it out of service.

Optionally, the optomechanical thermometer is a fin-type optomechanical oscillator.

Optionally, the photonic thermometer is a photonic crystal cavity.

Optionally, the photonic thermometer is a ring resonator.

Optionally, the photonic thermometer is a disk resonator.

Optionally, the nanophotonic thermometer system also includes a bus waveguide and a secondary layer of photoresist or dielectric oxide deposited onto the bus waveguide, the photonic thermometer, and the fin-type optomechanical thermometer.

Optionally, the nanophotonic thermometer system includes a bus waveguide and a silicon oxide substrate etched down beneath the bus waveguide, the photonic thermometer, and the fin-type optomechanical thermometer.

According to another aspect of the invention, a method of calibrating a nanophotonic thermometer system includes measuring a relative temperature of a sample using a photonic thermometer; measuring an absolute temperature of the sample using an optomechanical thermometer; and calibrating the photonic thermometer using the absolute temperature measurement and the relative temperature measurement.

Optionally, the method includes removing the nanophotonic thermometer system from a process environment at a predetermined calibration interval; placing the nanophotonic thermometer system in a bath environment; and returning the nanophotonic thermometer system to the process environment after the step of calibrating.

Optionally, the method includes changing a temperature of the bath environment or moving the nanophotonic thermometer system into a different bath environment at a different temperature.

Optionally, the method includes in situ calibration without the need either of removing the photonic thermometer, or the need of external temperature bath, during which a fixed temperature is established using an on-chip integrated temperature control micro-element such as, for example, a resistive micro heater imbedded in the photonic chip in immediate proximity next to photonic and optomechanical thermometers, a Peltier miniature heater/cooler module and/or a Joule-Thomson micro-cooler, located in the immediate proximity next to the photonic and optomechanical thermometers; electrical voltage is applied to the temperature control micro-element and adjusted until a measured resonance frequency response of the photonic thermometer is at a constant value, thus, at a fixed local temperature of the chip where both photonic and optomechanical thermometers are located. The optomechanical thermometer then provides the absolute thermodynamic temperature of the chip and is used to calibrate the photonic thermometer.

According to another aspect of the invention, a method of operating a nanophotonic thermometer system includes operating the system in a process environment; measuring a relative temperature of a sample using a photonic thermometer; measuring an absolute temperature of the sample using an optomechanical thermometer; comparing the absolute temperature measurement and the relative temperature measurement; and if the measurements disagree, correcting the calibration of the photonic thermometer, and if the measurements agree, continuing operation without correction.

Optionally, the method includes the steps of, if the measurements disagree, removing the nanophotonic thermometer system from the process environment; placing the nanophotonic thermometer system in a bath environment; measuring a relative temperature of the bath environment using the photonic thermometer; measuring an absolute temperature of the bath environment using an optomechanical thermometer; and calibrating the photonic thermometer using the absolute temperature measurement of the bath environment and the relative temperature measurement of the bath environment.

Optionally, the method includes the steps of providing a fixed local temperature on the photonic chip using a temperature control device embedded in the chip; measuring absolute local temperature using the optomechanical thermometer; and calibrating the photonic thermometer using the absolute temperature measurement of the chip.

The foregoing and other features of the invention are hereinafter described in greater detail with reference to the accompanying drawings.

DETAILED DESCRIPTION

Figure 1:
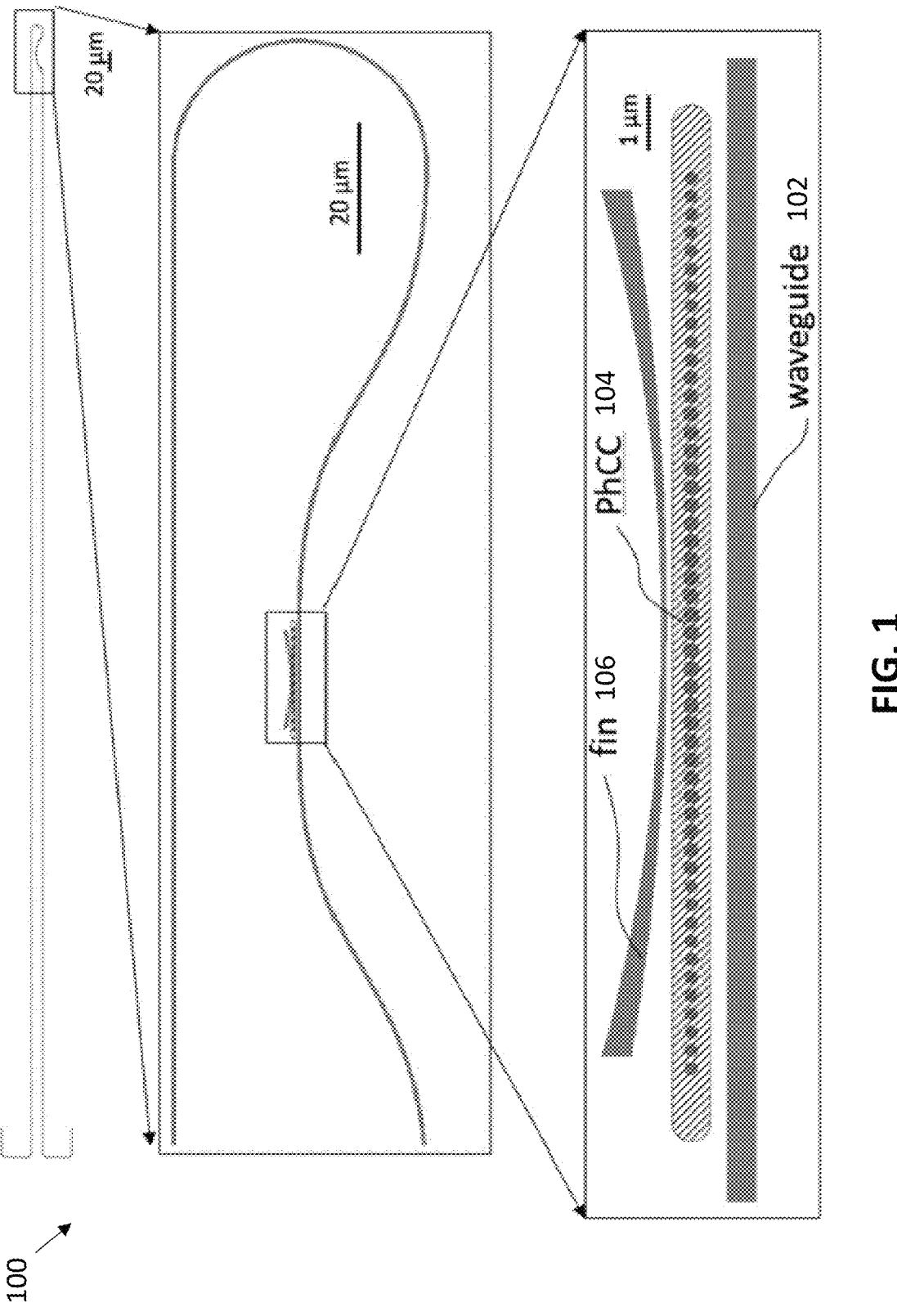
FIG. 1 shows an exemplary optomechanically calibrated photonic thermometer 100.

A detailed description of one or more embodiments is presented herein by way of exemplification and not limitation.

Resistance thermometry is a method of measuring temperature by measuring the change in resistance of a material as a function of temperature. A common type of resistance thermometer is the platinum resistance thermometer (SPRT). SPRTs are accurate and stable, but they are also fragile and involve recalibration.

Thermocouple thermometry is a method of measuring temperature by measuring the voltage generated by a thermocouple junction. Thermocouples are rugged and reliable, but they are not as accurate as SPRTs.

Optical thermometry is a method of measuring temperature by measuring the optical properties of a material as a function of temperature. Optical thermometers are fast, precise, and non-contact, but they can be expensive and difficult to calibrate.

Optomechanical thermometry is a type of optical thermometry that uses the interaction between light and mechanical motion to measure temperature. Optomechanical thermometers are small, lightweight, accurate, and robust, and they can be used to measure temperature in a variety of environments. However, they have a slow response time and low precision.

Conventional thermometers are typically calibrated using reference thermometers, such as platinum resistance thermometers (SPRTs). SPRTs are accurate and stable, but they are also bulky and expensive. Photonic thermometers are a promising alternative to SPRTs. Photonic thermometers are small, lightweight, and can be integrated with other devices. However, photonic thermometers, like SPRTs, require calibration.

There are not commercially available, primary, high-precision thermometers. In high-performance applications, the platinum resistance thermometer (PRT) has dominated the market for decades. However, PRTs are known to lose calibration due to, for example, mechanical shock, humidity variation, and device aging. Exemplary optomechanically calibrated photonic thermometers described herein provide long-term, calibration-free operation of photonic thermometers through in-situ optomechanical calibration. This will reduce downtime and improve accuracy in high-precision thermometry applications, particularly when recalibration is difficult or impossible (for example, on a satellite).

Exemplary optomechanically calibrated photonic thermometers may be a nanophotonic device that includes a photonic thermometer and an optomechanical thermometer. Integration of the two thermometers on the same chip allows fast, precise, calibration-free operation of the photonic thermometer via periodic intercomparison with the much slower optomechanical thermometer.

In an embodiment, an optomechanically calibrated photonic thermometer includes a photonic thermometer, optomechanical thermometer, and a bus waveguide. In an embodiment, an optomechanically calibrated photonic thermometer can additionally include an on-chip integrated temperature control micro-element such as, for example, a resistive micro heater imbedded in the photonic chip in immediate proximity next to photonic and optomechanical thermometers, a Peltier miniature heater/cooler module and/or a Joule-Thompson micro-module, located in the immediate proximity next to the photonic and optomechanical thermometers the photonic thermometer and optomechanical thermometer. In an embodiment, calibrating a photonic thermometer includes using the optomechanical thermometer to calibrate the photonic thermometer. Long-term repeatability is a significant problem in high-precision thermometry. State-of-the-art resistance thermometers, standard platinum resistance thermometers (SPRT), have some drawbacks, wherein they are fragile, and their accuracy degrades over time, which requires costly recalibration. Photonic thermometers can overcome the first drawback while maintaining high short-term precision. However, photonic thermometers involve initial calibration, and their long-term accuracy remains under investigation. Optomechanical thermometers have poor short-term precision, but are primary, because they are tied to fundamental constants, and thus maintain their accuracy over time. By combining a photonic thermometer and an optomechanical thermometer on a single substrate, a robust, high-precision thermometer with quantified and stable long-term accuracy may be created. Such a thermometer can be a major cost and time saver in industrial manufacturing.

FIG. 1 shows a top view of one embodiment of an optomechanically calibrated photonic thermometer 100. All outlines represent silicon structures patterned onto a silicon oxide substrate. Laser light from bus waveguide 102 is evanescently coupled to a nanophotonic resonator such as a photonic crystal cavity (PhCC) 104. When the optical frequency of the laser light matches the resonant mode of PhCC 104, it can enter the cavity (PhCC), thus reducing the optical transmission through bus waveguide 102. By measuring the transmission through bus waveguide 102, the resonance frequency of PhCC 104 can be deduced, which depends on the temperature (i.e. photonic crystal cavity 104 is a photonic thermometer). Light within PhCC 104 is also evanescently coupled to fin-type optomechanical thermometer 106. Fin-type optomechanical thermometer 106 moves (shown in dashed lines in FIG. 3, e.g., with respect to similar fin-type thermometer 306) within the evanescent field of PhCC 104, imprinting two Raman sidebands on the light within PhCC 104. The two Raman sidebands are also evanescently coupled to bus waveguide 102 and can be detected using the optical transmission of bus waveguide 102. Combining the detected Raman sidebands yields a primary temperature measurement via either their direct ratio or the ratio of their quantum and thermal correlations.

The optical transmission of bus waveguide 102 can therefore be used to determine relative temperature via photonic thermometry or absolute temperature via optomechanical thermometry. The absolute temperature measurement can be used to calibrate the relative temperature measurement. This calibration process can either be intermittent or continuous. In the intermittent process, the absolute temperature is only measured when a calibration of the photonic thermometer is deemed necessary. After the calibration is updated, the absolute temperature is no longer monitored, and the thermometer 100 acts only as a calibrated photonic thermometer. In the continuous process, both relative and absolute temperature are measured concurrently. The calibration of the photonic thermometer is then updated whenever the absolute and relative temperatures disagree by more than their mutual uncertainty. Generally, the continuous process is preferable. However, the intermittent process is advantageous in environments subject to large, rapid temperature variation where the optomechanical thermometer may not attain low enough uncertainty on the timescale of the temperature variation.

Figure 2:
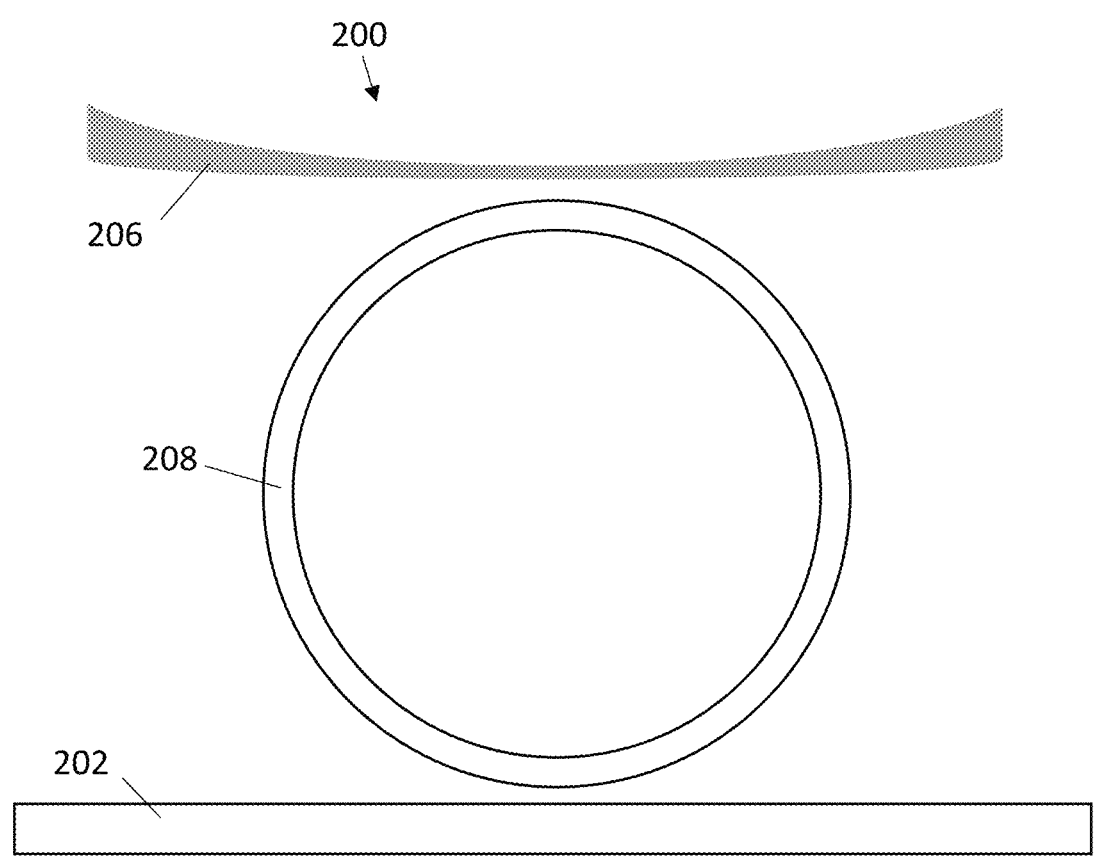
FIG. 2 shows an exemplary optomechanically calibrated photonic thermometer 200, including a ring resonator.

Referring now to FIG. 2, an optomechanically calibrated photonic thermometer 200 includes a ring resonator 208 that functionally replaces the photonic crystal cavity from FIG. 1. Ring resonator 208 may serve as both the photonic thermometer and to transfer the Raman sideband signal to bus waveguide 202. Ring resonators have a larger size optical mode than PhCCs and thus smaller thermo-refractive noise, allowing higher precision photonic thermometry. Furthermore, ring resonator 208 can have a smaller free spectral range (FSR) than PhCC 104, that can be exploited in certain photonic thermometry readout methods.

Figure 3:
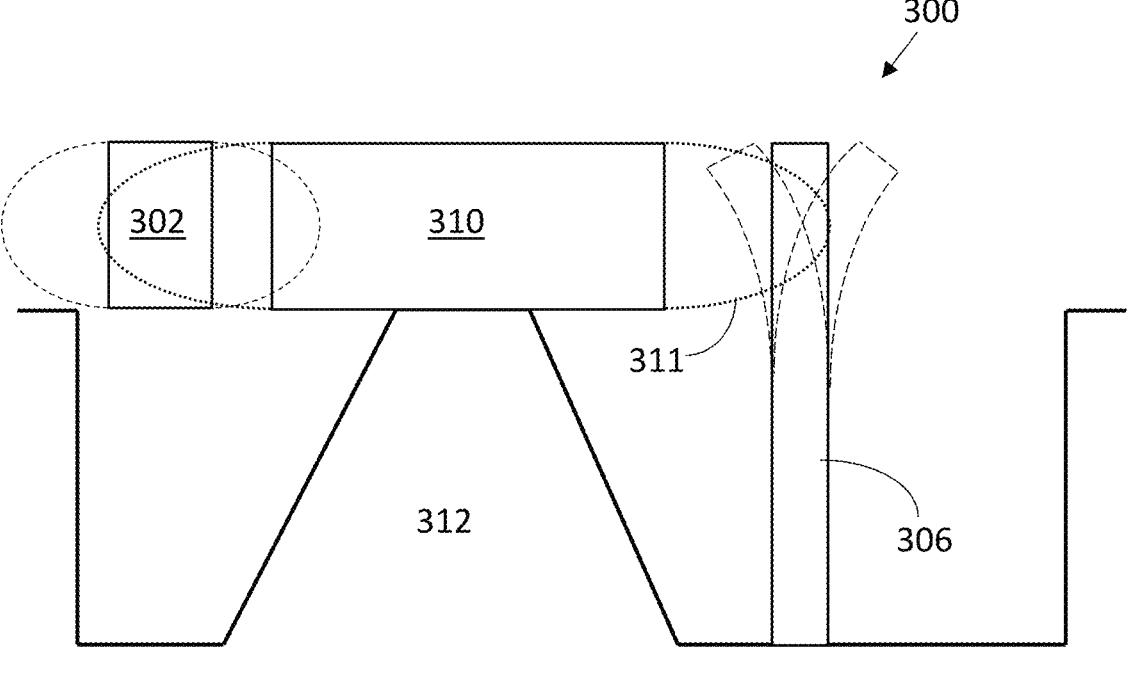
FIG. 3 shows a side view of an exemplary optomechanically calibrated photonic thermometer 300 with an undercut disk resonator 310, wherein evanescent fields of bus waveguide 302 and disk resonator 310 are shown in dashed ad dotted lines, respectively. Mechanical motion of fin-type optomechanical thermometer 306 is depicted in long dash lines.

Referring now to FIG. 3, an optomechanically calibrated photonic thermometer 300 includes a disk resonator 310 as the photonic resonator. Fin-type optomechanical thermometer 306 is placed within the evanescent field 311 of disk resonator 310. Disk resonator 310 now serves as both the photonic thermometer and transfers the Raman sideband signal to bus waveguide 302. Like ring resonators, disk resonators have a larger size optical mode than PhCCs and thus smaller thermo-refractive noise, allowing higher precision photonic thermometry. Disk resonator 310 can have a smaller free spectral range (FSR) than PhCC 104, that can be exploited in certain photonic thermometry readout methods. Another benefit is an additional etch step needed to undercut disk resonator 310 by etching away substrate 312. The additional etch step both improves the mechanical quality factor of fin-type thermometer 306 and increases its coupling to the evanescent field from disk resonator 310. These two effects both boost the signal-to-noise ratio of the Raman sideband measurement.

Figure 4:
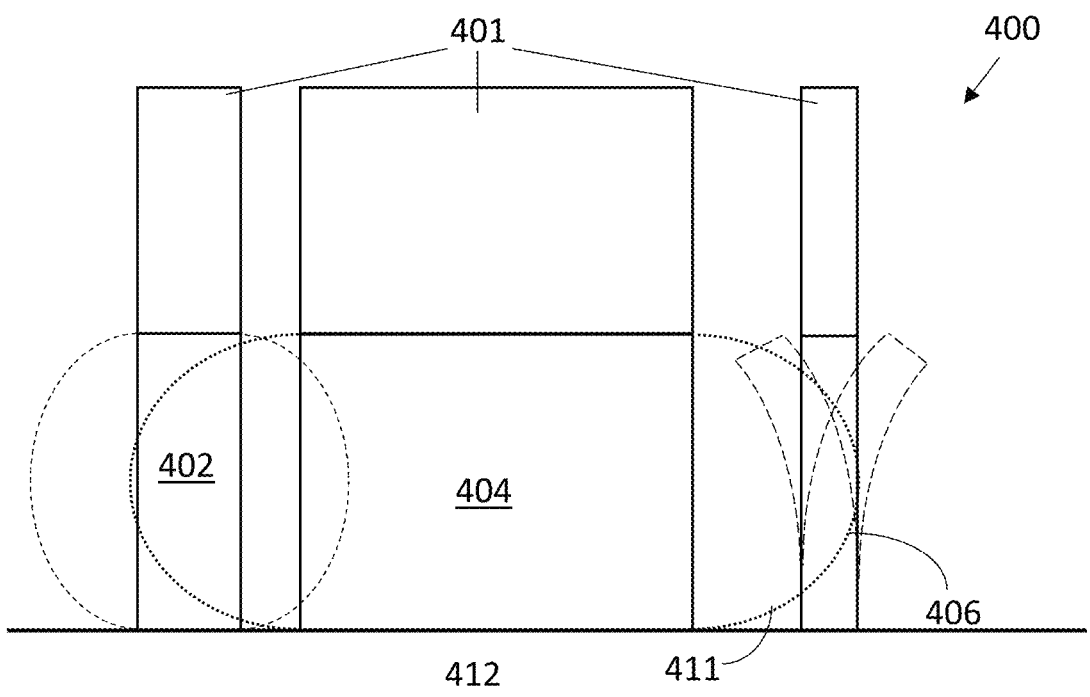
FIG. 4 shows a side view of an exemplary optomechanically calibrated photonic thermometer 400 that includes a layer of photoresist or dielectric oxide disposed on Si.
Figure 5:
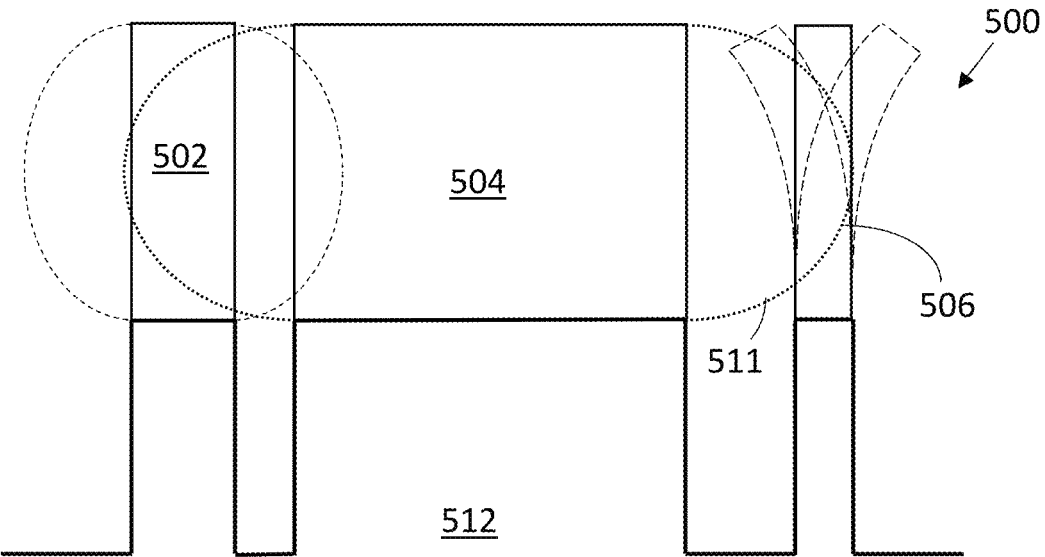
FIG. 5 shows a side view of an exemplary optomechanically calibrated photonic thermometer 500 with an etch of the silicon oxide substrate.

Turning now to FIGS. 4 and 5, exemplary embodiments of the optomechanically calibrated photonic thermometer are shown at 400 and 500. The same reference numerals but indexed by 100 are used to denote structures corresponding to similar structures in the previously-depicted the optomechanically calibrated photonic thermometers. In addition, the foregoing descriptions are equally applicable except as noted below. Moreover, it will be appreciated upon reading and understanding the specification that aspects of the optomechanically calibrated photonic thermometers 100, 200, 300 may be substituted for one another or used in conjunction with one another where applicable.

Optomechanically calibrated photonic thermometers, e.g., as shown in FIGS. 1 and 2, can be modified to change, e.g., improve, performance of fin-type optomechanical thermometer 106, 206 (these modifications are effectively incorporated in optomechanically calibrated photonic thermometer 300 as shown in FIG. 3). A secondary layer of photoresist 401 or dielectric oxide can be deposited onto all of bus waveguide 402, photonic crystal cavity 404 (or ring resonator), and fin-type optomechanical thermometer 406. This additional layer improves the mechanical quality factor of fin-type thermometer 406, increasing the signal-to-noise ratio of the Raman sideband measurement.

Additionally or alternatively, the silicon oxide substrate 512 can be etched down (shown in FIG. 5). The additional etch step both improves the mechanical quality factor of fin-type thermometer 506 and increases its coupling to the evanescent field 511 from photonic crystal cavity 504 (or ring resonator). These two effects both boost the signal-to-noise ratio of the Raman sideband measurement.

Exemplary photonic thermometers may be used to measure the relative temperature of a sample. Exemplary optomechanical thermometers may be used to measure the absolute temperature of the sample. The relative temperature measurement may be calibrated using the absolute temperature measurement.

In an embodiment, a process for calibrating a photonic thermometer includes: measuring the relative temperature of the sample with the photonic thermometer; measure the absolute temperature of the sample with the optomechanical thermometer; calibrating the relative temperature measurement with the absolute temperature measurement; and optionally periodically repeating the calibration process to ensure that the photonic thermometer is calibrated correctly.

As used herein, "process environment" means a location where an end user seeks to measure the temperature during normal operation and the like. In contrast, the "bath environment" means a location for reference calibration. The "calibration interval" is the duration of time between calibrations, which may be a predetermined time interval or may be of unknown duration but determined by certain other criteria including environmental variables, usage frequency, and the like. A preferred interval may be 1 year or more for typical users, but might be much shorter in a harsh environment like a nuclear reactor.

In simplified form, the reading of the photonic thermometer $T_r$ gives the absolute temperature T through the equation $$T = A * T_r + B, \tag{1}$$

where A and B are calibration coefficients. Ideally, A=1 and B=0. The optomechanical thermometer is primary, so its reading yields T directly. Note that in practice the conversion from reading $T_r$ to absolute temperature T may be a higher order polynomial.

Figure 6:
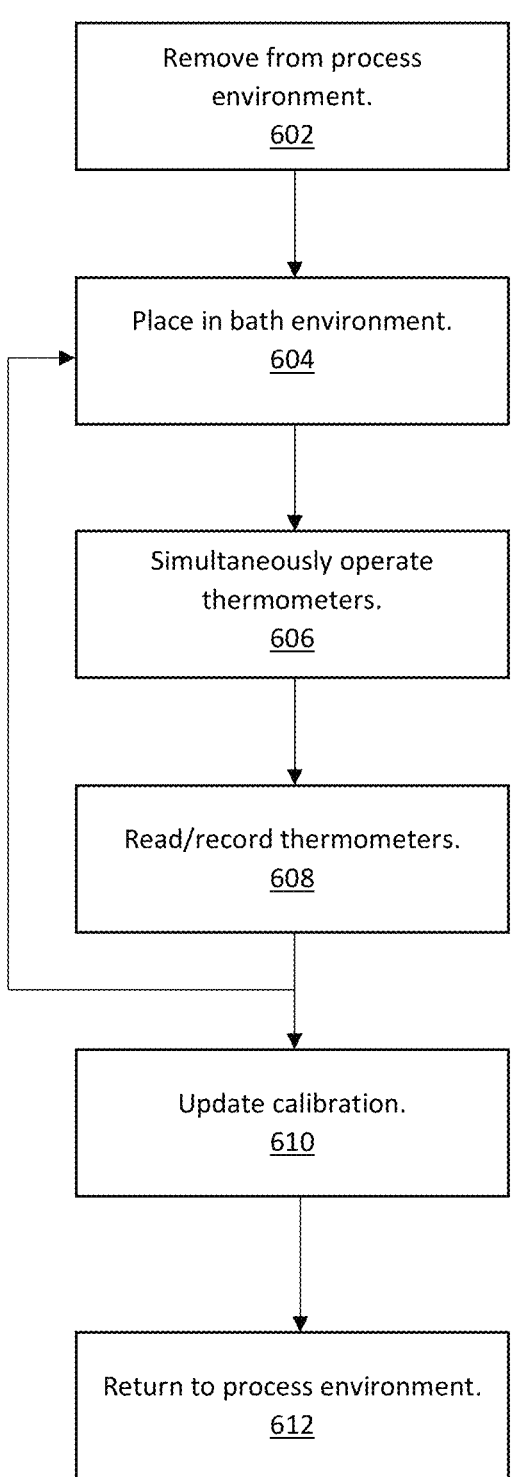
FIG. 6 shows an exemplary method of calibration.

Referring now to FIG. 6, shown is a process 600 for intermittent calibration.

At block 602, the optomechanically calibrated photonic thermometer is removed from a process environment at a predetermined calibration interval.

At block 604, the optomechanically calibrated photonic thermometer is placed in a bath environment (such as a low-temperature cryostat, temperature-controlled stirred liquid bath, dry block temperature calibrator, fixed-point cell, etc.).

At block 606, the photonic and optomechanical thermometers are simultaneously operated in the optomechanically calibrated photonic thermometer.

At block 608, the two thermometers are read and the readings may be recorded.

Optionally, the process may now return to block 604 and change the temperature of the bath environment or move the optomechanically calibrated photonic thermometer into a different bath environment that operates at a different temperature (e.g., another triple-point cell). This optional circuit may iterate a number of predetermined times or until a predetermined condition is met.

At block 610, the readings of the photonic and optomechanical thermometers are used to update the calibration of the photonic thermometer. If only one bath environment temperature was used, the offset B may be corrected (and assume that slope coefficients A are unchanged). If more than one bath environment temperature was used, offset and slope may both be corrected.

At block 612, the optomechanically calibrated photonic thermometer may be returned to the process environment and operated until the end of the next calibration interval.

Figure 7:
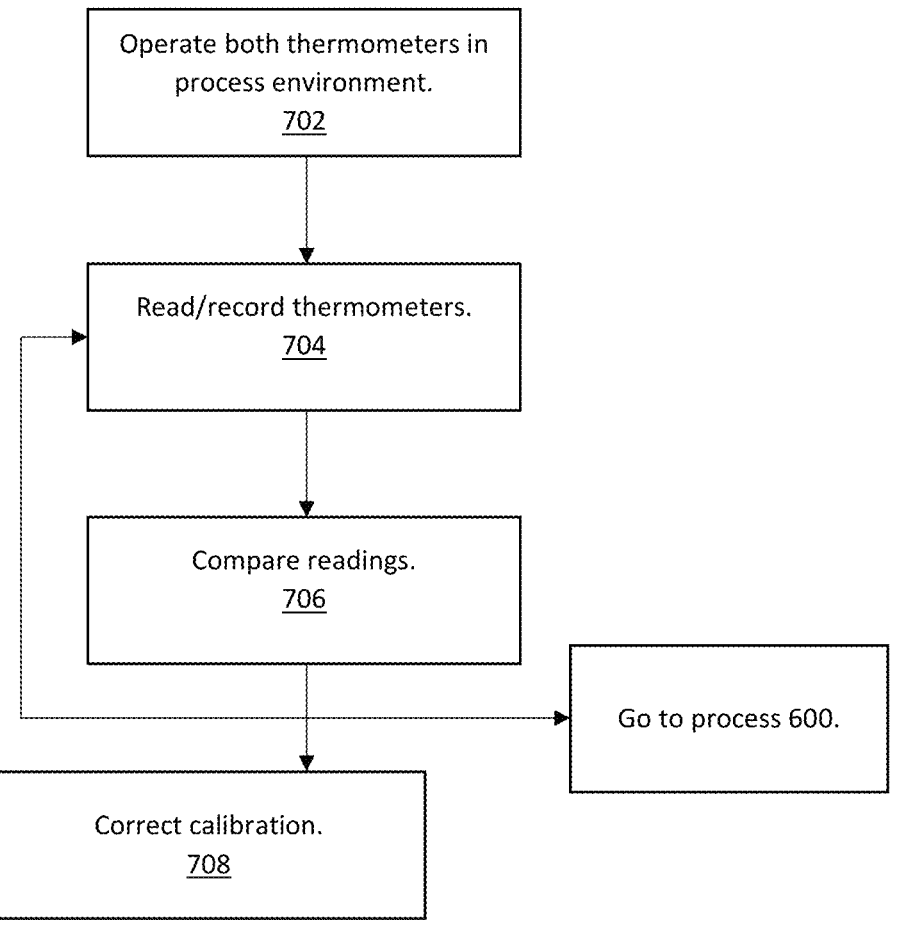
FIG. 7 shows another exemplary method of calibration.

Referring now to FIG. 7, shown is a process 700 for continuous calibration.

At block 702 both the photonic and optomechanical thermometers may be operated in a process environment.

At block 704, the two thermometers are read and the readings may be recorded.

At block 706, the readings are compared. If the two readings disagree, then the calibration of the photonic thermometer may be corrected at block 708 so that its reading agrees with the optomechanical thermometer. Since only one temperature is used here, only B from Eq. 1 may be corrected. Optionally, the optomechanically calibrated photonic thermometer may be removed from the process environment and an intermittent calibration process 600 may now be performed. If the two readings agree, the process returns to block 704.

Figure 8:
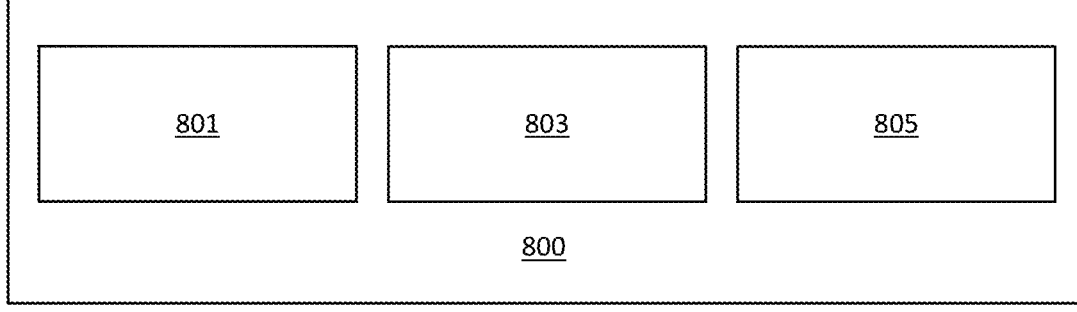
FIG. 8 shows a schematic diagram of an exemplary optomechanically calibrated photonic thermometer 800 with an integrated temperature controller.

Referring now to FIG. 8, shown is a schematic of an exemplary optomechanically calibrated photonic thermometer system 800 that includes an optomechanical thermometer 801, a photonic thermometer 803, and a temperature control device 805. The inclusion of the temperature control device allows for in situ calibration of the optomechanically calibrated photonic thermometer system 800 using, for example, the process described below with reference to FIG. 9, without the need either of removing the photonic thermometer, or the need of external temperature bath. Instead of using an external temperature bath, a fixed temperature is established using the temperature control device which may be mounted nearby, or, preferably, be an on-chip integrated temperature control micro-element such as, for example, a resistive micro heater imbedded in the photonic chip in immediate proximity next to photonic and optomechanical thermometers, a Peltier miniature heater/cooler module and/or a Joule-Thomson micro-cooler, located in the immediate proximity next to the photonic and optomechanical thermometers.

Figure 9:
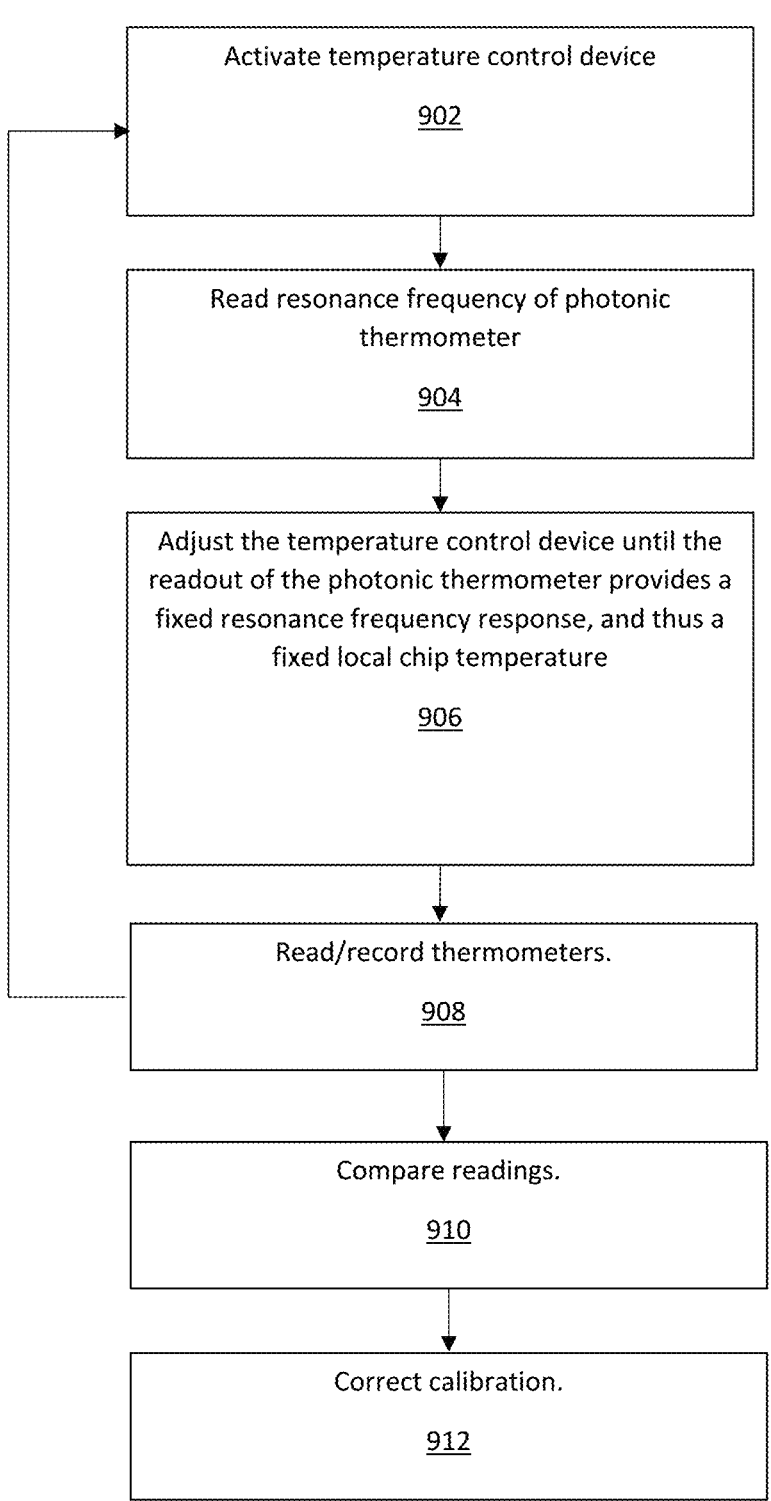
FIG. 9 shows another exemplary method of calibration.

Referring now to FIG. 9, shown is a process 900 for in situ calibration. At block 902 a temperature control device is activated. For example, the current is applied to on-chip integrated temperature control micro-element.

At block 904 the resonance frequency of the photonic thermometer is measured.

At block 906 the temperature control device is adjusted (for example, electrical voltage is applied to the on-chip integrated temperature control micro-element) until the resonance frequency of the photonic thermometer shows a steady (not changing in time) value.

At block 908 both readings from photonic and optomechanical thermometers are measured and may be recorded.

Optionally, the process may now return to block 902 and adjust the temperature control device to achieve a different stable resonance frequency of the photonic thermometer. This optional circuit may iterate a number of predetermined times or until a predetermined condition is met.

At block 910, the readings of the photonic and optomechanical thermometers are compared. If the readings disagree, then the calibration of the photonic thermometer may be corrected at block 912 so that its reading agrees with the optomechanical thermometer. If only one temperature was used, the offset B may be corrected (and assume that slope coefficients A are unchanged). If more than temperature was used, offset and slope may both be corrected.

In an embodiment, a method for calibrating a photonic thermometer includes: measuring the relative temperature of a sample using a photonic thermometer; measuring the absolute temperature of the sample using an optomechanical thermometer; and calibrating the photonic thermometer using the absolute temperature measurement. In an embodiment, the optomechanical thermometer is integrated with the photonic thermometer. In an embodiment, the optomechanical thermometer is a fin-type optomechanical oscillator. In an embodiment, the photonic thermometer is a photonic crystal cavity.

Exemplary optomechanically calibrated photonic thermometers can be made of various elements and components that are microfabricated. Elements of exemplary optomechanically calibrated photonic thermometers can be of various sizes. Elements of exemplary optomechanically calibrated photonic thermometers can be made of a material that is physically or chemically resilient in the environment in which it is disposed. Exemplary materials include metal, ceramic, thermoplastic, glass, semiconductor, and the like. The elements of exemplary optomechanically calibrated photonic thermometers can be made of the same or different material and can be monolithic in a single physical body or can be separate members that are physically joined.

An exemplary temperature control micro-element can be a restive microheater; the resistive microheater can be comprised of resistance metal or doped semiconductor and can be of various sizes; microheater can be positioned on top, aside, or beneath the photonic and optomechanical thermometer; if microheater is position on to of beneath the thermometer, the microheater should be separated from the thermometer with a dielectric layer/spacer.

Another exemplary temperature control micro-element can be a miniature Peltier heater/cooler module, and/or micromachined Joule-Thomson microcooler. Peltier module and/or Joule Thomson microcooler can be integrated on the chip or attached to the chip.

Exemplary optomechanically calibrated photonic thermometers can be made in various ways. It should be appreciated that exemplary optomechanically calibrated photonic thermometers include a number of optical, electrical, or mechanical components, wherein such components can be interconnected and placed in communication (e.g., optical communication, electrical communication, mechanical communication, and the like) by physical, chemical, optical, or free-space interconnects. The components can be disposed on mounts that can be disposed on a bulkhead for alignment or physical compartmentalization. As a result, exemplary optomechanically calibrated photonic thermometers can be disposed in a terrestrial environment or space environment. Elements of exemplary optomechanically calibrated photonic thermometers can be formed from silicon, silicon nitride, and the like although other suitable materials, such ceramic, glass, or metal can be used. According to an embodiment, the elements of an exemplary optomechanically calibrated photonic thermometer are formed using 3D printing although the elements can be formed using other methods, such as injection molding or machining a stock material such as block of material that is subjected to removal of material such as by cutting, laser oblation, and the like. Accordingly, exemplary optomechanically calibrated photonic thermometers can be made by additive or subtractive manufacturing. In an embodiment, elements of an exemplary optomechanically calibrated photonic thermometer are selectively etched to remove various different materials using different etchants and photolithographic masks and procedures. The various layers thus formed can be subjected to joining by bonding to form an exemplary optomechanically calibrated photonic thermometer.

In an embodiment, an exemplary optomechanically calibrated photonic thermometer and an exemplary method of calibrating a photonic thermometer include the properties, functionality, hardware, and process steps described herein and embodied in any of the following non-exhaustive list:

a process (e.g., a computer-implemented method including various steps; or a method carried out by a computer including various steps);

an apparatus, device, or system (e.g., a data processing apparatus, device, or system including means for carrying out such various steps of the process; a data processing apparatus, device, or system including means for carrying out various steps; a data processing apparatus, device, or system including a processor adapted to or configured to perform such various steps of the process);

a computer program product (e.g., a computer program product including instructions which, when the program is executed by a computer, cause the computer to carry out such various steps of the process; a computer program product including instructions which, when the program is executed by a computer, cause the computer to carry out various steps);

computer-readable storage medium or data carrier (e.g., a computer-readable storage medium including instructions which, when executed by a computer, cause the computer to carry out such various steps of the process; a computer-readable storage medium including instructions which, when executed by a computer, cause the computer to carry out various steps; a computer-readable data carrier having stored thereon the computer program product; a data carrier signal carrying the computer program product);

a computer program product including comprising instructions which, when the program is executed by a first computer, cause the first computer to encode data by performing certain steps and to transmit the encoded data to a second computer; or a computer program product including instructions which, when the program is executed by a second computer, cause the second computer to receive encoded data from a first computer and decode the received data by performing certain steps.

Exemplary optomechanically calibrated photonic thermometers and processes disclosed herein have numerous beneficial uses. Exemplary optomechanically calibrated photonic thermometers and methods of calibrating a photonic thermometer have several advantages over conventional methods of calibrating photonic thermometers. First, exemplary systems and methods use an optomechanical thermometer to measure the absolute temperature of the sample. Optomechanical thermometers are accurate and stable, and they can be integrated with other devices. Second, exemplary systems and methods calibrate the photonic thermometer using the absolute temperature measurement. This ensures that the photonic thermometer is calibrated correctly. Third, exemplary systems and methods can be implemented in a variety of ways.

The processes described herein may be embodied in, and fully automated via, software code modules executed by a computing system that includes one or more general-purpose computers or processors. The code modules may be stored in any type of non-transitory computer-readable medium or other computer storage device. Some or all the methods may alternatively be embodied in specialized computer hardware. In addition, the components referred to herein may be implemented in hardware, software, firmware, or a combination thereof.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores, or on other parallel architectures, rather than sequentially. In addition, different tasks or processes can be performed by different machines and/or computing systems that can function together.

Any logical blocks, modules, and algorithm elements described or used in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described or used in connection with the embodiments disclosed herein can be implemented or performed by a machine, such as a processing unit or processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix (s) as used herein is intended to include both the singular and the plural of the term that it modifies, thereby including at least one of that term (e.g., the colorant(s) includes at least one colorants). Option, optional, or optionally means that the subsequently described event or circumstance can or cannot occur, and that the description includes instances where the event occurs and instances where it does not. As used herein, combination is inclusive of blends, mixtures, alloys, reaction products, collection of elements, and the like.

As used herein, a combination thereof refers to a combination comprising at least one of the named constituents, components, compounds, or elements, optionally together with one or more of the same class of constituents, components, compounds, or elements.

All references are incorporated herein by reference.

The use of the terms "a," "an," and "the" and similar referents in the context of describing the invention (especially in the context of the following claims) are to be construed to cover both the singular and the plural, unless otherwise indicated herein or clearly contradicted by context. It can further be noted that the terms first, second, primary, secondary, and the like herein do not denote any order, quantity, or importance, but rather are used to distinguish one element from another. It will also be understood that, although the terms first, second, etc. are, in some instances, used herein to describe various elements, these elements should not be limited by these terms. For example, a first current could be termed a second current, and, similarly, a second current could be termed a first current, without departing from the scope of the various described embodiments. The first current and the second current are both currents, but they are not the same condition unless explicitly stated as such.

The modifier about used in connection with a quantity is inclusive of the stated value and has the meaning dictated by the context (e.g., it includes the degree of error associated with measurement of the particular quantity). The conjunction or is used to link objects of a list or alternatives and is not disjunctive; rather the elements can be used separately or can be combined together under appropriate circumstances.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above-described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A nanophotonic thermometer system comprising:
   a photonic thermometer; and
   an optomechanical thermometer configured to calibrate the photonic thermometer, thereby making the thermometer system an optomechanically calibrated photonic thermometer.

2. The nanophotonic thermometer system of claim 1, wherein the optomechanical thermometer is a fin-type optomechanical oscillator.

3. The nanophotonic thermometer system of claim 2, further comprising:
a bus waveguide; and
a secondary layer of photoresist or dielectric oxide deposited onto the bus waveguide, the photonic thermometer, and the fin-type optomechanical thermometer.

4. The nanophotonic thermometer system of claim 2, further comprising:
a bus waveguide; and
a silicon oxide substrate etched down beneath the bus waveguide, the photonic thermometer, and the fin-type optomechanical thermometer.

5. The nanophotonic thermometer system of claim 1, wherein the photonic thermometer is a photonic crystal cavity.

6. The nanophotonic thermometer system of claim 1, wherein the photonic thermometer is a ring resonator.

7. The nanophotonic thermometer system of claim 1, wherein the photonic thermometer is a disk resonator.

8. The nanophotonic thermometer system of claim 1, further comprising a temperature control device integrated on-chip with the photonic thermometer and the optomechanical thermometer.

9. A method of calibrating a nanophotonic thermometer system comprising:
activating a temperature control device of the nanophotonic thermometer system;
adjusting the temperature control device while iteratively measuring a relative temperature of the nanophotonic thermometer system until a photonic thermometer provides a fixed resonance frequency response; and
measuring an absolute temperature of the nanophotonic thermometer system using an optomechanical thermometer; and
calibrating the photonic thermometer using the absolute temperature measurement and a stable relative temperature measurement.

10. The method of claim 9, further comprising the step of changing to a different stable resonance frequency response of the photonic thermometer by adjusting the temperature control device.

11. A method of calibrating a nanophotonic thermometer system comprising:
measuring a relative temperature of a sample using a photonic thermometer;

measuring an absolute temperature of the sample using an optomechanical thermometer; and
calibrating the photonic thermometer using the absolute temperature measurement and the relative temperature measurement.

12. The method of claim 11, further comprising the steps of:
removing the nanophotonic thermometer system from a process environment at a predetermined calibration interval;
placing the nanophotonic thermometer system in a bath environment; and
returning the nanophotonic thermometer system to the process environment after the step of calibrating.

13. The method of claim 12, further comprising the step of changing a temperature of the bath environment or moving the nanophotonic thermometer system into a different bath environment at a different temperature.

14. A method of operating a nanophotonic thermometer system comprising the steps of:
operating the nanophotonic thermometer system in a process environment;
measuring a relative temperature of a sample using a photonic thermometer of the nanophotonic thermometer system;
measuring an absolute temperature of the sample using an optomechanical thermometer of the nanophotonic thermometer system;
comparing the absolute temperature measurement and the relative temperature measurement; and
if the measurements disagree, correcting the calibration of the photonic thermometer, and if the measurements agree, continuing operation without correction.

15. The method of claim 14, further comprising the step of:
if the measurements disagree, removing the nanophotonic thermometer system from the process environment;
placing the nanophotonic thermometer system in a bath environment;
measuring a relative temperature of the bath environment using the photonic thermometer;
measuring an absolute temperature of the bath environment using the optomechanical thermometer; and
calibrating the photonic thermometer using the absolute temperature measurement of the bath environment and the relative temperature measurement of the bath environment.

* * * * *